United States Patent [19]

Sutt

[11] Patent Number: 4,817,659
[45] Date of Patent: Apr. 4, 1989

[54] APPARATUS FOR AUTOMATICALLY METERING GAS INTO LIQUID

[75] Inventor: Iokhannes I. Sutt, Tallin, U.S.S.R.

[73] Assignee: Tallinskoe Proizvodstvennoe Upravlenie Vodosnabsheniya I Kanalizatsii, Tallinn, U.S.S.R.

[21] Appl. No.: 134,784
[22] PCT Filed: Dec. 8, 1986
[86] PCT No.: PCT/SU86/00125
   § 371 Date: Sep. 30, 1987
   § 102(e) Date: Sep. 30, 1987
[87] PCT Pub. No.: WO87/05133
   PCT Pub. Date: Aug. 27, 1987
[51] Int. Cl.⁴ .............................................. G05D 7/00
[52] U.S. Cl. ..................................... 137/88; 137/495; 137/613
[58] Field of Search ............... 137/495, 88, 93, 98, 137/100, 101.19, 613

[56] References Cited

U.S. PATENT DOCUMENTS 2,938,539  5/1960  Holmes .......................... 137/495 X
2,982,300  5/1961  Jackson .............................. 137/495
4,232,700  11/1980  Sutt ....................................... 137/93

FOREIGN PATENT DOCUMENTS 3424088  1/1985  Fed. Rep. of Germany .
198715   8/1967  U.S.S.R. .
723520   3/1980  U.S.S.R. .

Primary Examiner—Alan Cohan
Attorney, Agent, or Firm—Burgess, Ryan & Wayne

[57] ABSTRACT

An apparatus for automatically metering gas into liquid comprises a gas supply line including a gas pressure regulator (1), a gas flow meter (2), a gas flow governor (3), a vacuum check valve, and an ejector (5) connected to a supply line of the liquid being gasified, a liquid flow meter (9), and a control system (39). The gas flow governor (3) and the vacuum check valve are integrated in a single unit including a sealed chamber (11) whose two opposite walls are defined by diaphragms (12,13), a hollow cylinder (14) disposed between the diaphragms and having a central opening (17) through one its face end, a sleeve (19) with a closed end, mounted coaxially with the hollow cylinder centrally of a diaphragm (13), its closed end being fixedly connected with an output element (26) of the gas flow governor (3), and a needle valve with a valve with a valve seat (2) and a valve member including a stem (22) with a pointed tip (23) on its one end, extending axially of the hollow cylinder.

1 Claim, 1 Drawing Sheet

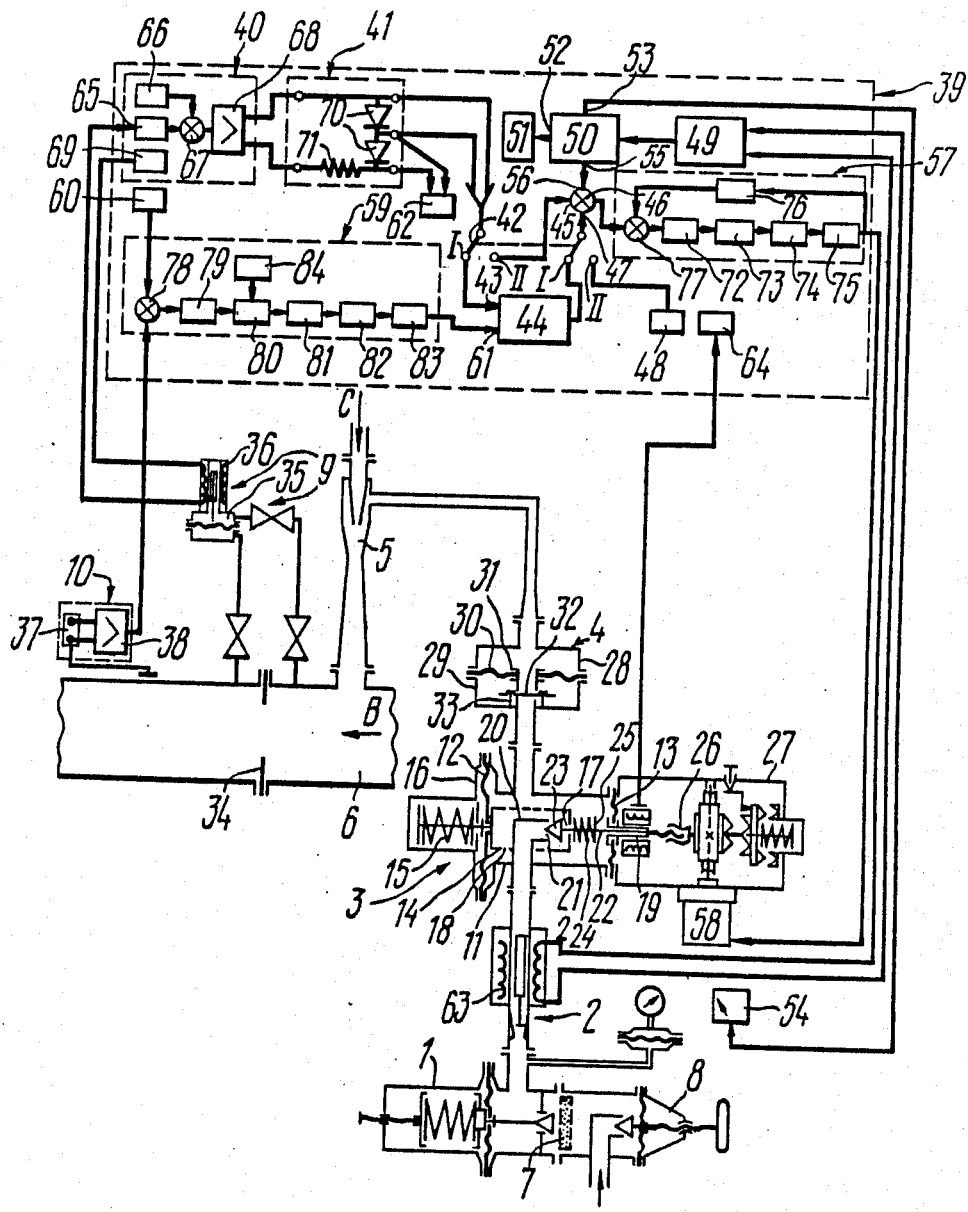

APPARATUS FOR AUTOMATICALLY METERING GAS INTO LIQUID

FIELD OF THE INVENTION

The invention relates to fluid metering apparatus, and more particularly it relates to an apparatus for automatically metering gas into liquid, e.g. chlorine into water.

PRIOR ART

There is known an apparatus for automatically metering gas into liquid, comprising, successively arranged along the gas supply line, a gas flow meter, a flow governor, a vacuum check valve and an ejector for preparing a gas-liquid mixture. The ejector is hydraulically connected with the supply line of the liquid being gasified, including a liquid flow meter. The known apparatus further comprises a control system to whose inputs signals are sent from the outputs of the liquid and gas flow meters, the system incorporating a master control for presetting the required gas-liquid ratio. The control system generates at its output a signal sent to the input of the gas flow governor to maintain the preset gas concentration in the liquid (see SU Inventors' Certificate No. 292540; Int. Cl.$^2$ G01F 13/00, published in 1973).

However, this known apparatus is incapable of ensuring adequate accuracy of maintaining the required concentration of the gas in the liquid when the degree of absorption of the gas by the liquid sharply varies, or else when the liquid flow rate fluctuates rapidly.

There is further known an apparatus for automatically metering gas into liquid, e.g. chlorine into water, comprising, successively arranged in the gas supply line, a gas pressure regulator, a gas flow meter, a gas flow governor, a vacuum check valve and an ejector connected to the supply line of the liquid to be gasified, the liquid supply line including a liquid flow meter. The apparatus further comprises a control system having its respective inputs connected to the liquid and gas flow meters, and its output connected to the actuating mechanism of the gas flow governor (see U.S. Pat. No. 4,232,700; Int.Cl.$^3$ G05D 11/08, published in 1980).

This known apparatus also comprises means for measuring the concentration of the gas in the liquid, incorporated in the liquid supply line downstream of the point of connection of the ejector to this line, at a distance therefrom. A signal coming from the concentration measuring means corrects the setting of the master control of gas-to-liquid ratio.

This apparatus provides for accounting for a varying degree of absorption of the gas by the liquid and thus for maintaining a required concentration of the gas in the liquid.

However, this last-described known apparatus is structurally complex, its mechanical part incorporating a relatively great number of components including those with non-linear response such as the vacuum check valve, which causes oscillating processes in the control system affecting quick restoration of a preset liquid-to-gas ratio.

DISCLOSURE OF THE INVENTION

This invention is to provide an apparatus for automatically metering gas into liquid which is structurally simplier and has fewer non-linear elements in its mechanical portion in order to improve the quality of regulation and to make the apparatus more reliable.

This object is attained in an apparatus for automatically metering gas into liquid, comprising, successively arranged in the gas supply line, a gas pressure regulator, a gas flow meter, a gas flow governor, a vacuum check valve and an ejector connected to the supply line of the liquid being gasified, a liquid flow meter in the liquid supply line and a control system having its respective inputs connected to the outputs of the gas and liquid flow meters and its output connected to the actuating mechanism of the gas flow governor, in which apparatus, in accordance with the invention, the gas flow governor and vacuum check valve are integrated in a single unit including a sealed chamber having its two opposite walls formed by two substantially parallel diaphragms, a hollow cylinder being accommodated between the two diaphragms, having its one end fixedly attached to one of the diaphragms for reciprocatory oscillation therewith axially of the cylinder and having a central opening made through the other end thereof, a sleeve with a closed end being mounted coaxial with the cylinder in the centre of the other diaphragm and having its closed end fixedly attached to the output element of the actuating mechanism of the gas flow governor, a needle valve having its seat accommodated inside the hollow cylinder coaxially therewith, mounted in the side wall of a closed-end pipe communicating with the internal space of the gas flow meter and passing through a slot in the side wall of the cylinder, the valve member of the needle valve being in the form of a stem with a pointed tip on its one end, extending axially of the cylinder, the end of the stem with the tip thereon extending into the inner space of the cylinder through the central opening made through said other end thereof, for the pointed tip to interact with the seat of the valve and for the base of the tip to interact with the inner face of said other end of the hollow cylinder, the other end of the stem being mounted in the sleeve for reciprocation therein and interaction with the closed end of the sleeve under the bias of a resilient member.

In an apparatus for automatically metering gas into liquid, constructed in accordance with the present invention, the integration in a single unit of the vacuum check valve and gas flow governor has allowed to eliminate from the control circuitry the source of non-linear hydraulic resistance associated with the seat and valve member of the vacuum check valve of structure of the prior art, thus enhancing the regulation quality and stability of the regulation system.

Furthermore, an apparatus constructed in accordance with the invention is more compact than hitherto known devices operated for similar purposes, has less components and is simpler in manufacture.

BRIEF DESCRIPTION OF THE DRAWING

The invention will be further described in connection with an embodiment thereof, with reference being made to the accompanying drawing schematically illustrating the electric, hydraulic and mechanical circuitry of an apparatus for automatically entering gas into liquid, constructed in accordance with the invention.

BEST MODE FOR CARRYING OUT THE INVENTION

The embodiment of the present invention described hereinbelow is an apparatus for automatically metering gaseous chlorine into water.

The apparatus schematically illustrated in the appended drawing, operated for automatically metering chlorine into water, comprises a gas supply line with the following components arranged in this line in succession: a gas pressure regulator 1, a gas flow meter 2, a gas flow governor 3, a check valve 4 and an ejector 5 communicating with a supply line 6 of water to be chlorinated. Mounted upstream of the gas pressure regulator are a filter 7 and an inlet control valve 8. The water supply line 6 includes a water flow meter 9 and a device 10 for measuring the concentration of chlorine in water, downstream and at a distance from the point of introduction of chlorine into water. In the appended schematic drawing, arrow A indicates the supply direction of gaseous chlorine, arrow B indicates the flow direction of water in the line 6, and arrow C indicates the direction of feed of water under pressure into the ejector 5.

The gas flow governor 3 integrated with the vacuum check valve includes a sealed chamber 11 whose opposite walls are defined by two parallel diaphragms 12 and 13. Mounted between them in the chamber 11 is a hollow cylinder 14 having its one end fixed to the diaphragm 12. From the opposite side the diaphragm 12 is biased by an extension spring 15, the effort of the spring 15 being so selected that when the pressure in the chamber 11 is at the atmospheric value, the diaphragm 12 is urged against the cover 16. The opposite end of the cylinder 14 has a central opening 17 made through it, and slots 18 are made through its side wall in opposition to each other. The cylinder 14 is mounted for axial reciprocation jointly with the diaphragm 12. A sleeve 19 coaxial with the cylinder 14 is mounted centrally in the diaphragm 13, the end of the sleeve 19 remote from the cylinder 14 being closed. A closed-end pipe 20 extends into the inner space of the cylinder 14 through the slot 18, communicating with the inner space of the chamber of the gas flow meter 2, the length of the slots 18 axially of the cylinder 14 being sufficient to provide for limited reciprocation of the cylinder 14. Built into the side wall of the closed-end pipe 20 coaxially with the cylinder 14 is a seat 21 of a needle valve of which the valve member is in the form of a cylindrical stem 22 with a pointed (conical) tip 23 on its end, the diameter of the base of the conical tip 23 being in excess of the diameter of the stem 22, so that the tip 23 at its widest portion extends radially beyond the periphery of the stem 22. The stem 22 extends axially of the cylinder 14, its end with the tip 23 entering the inner space of the cylinder 14 through its central opening 17, so that the stem 22 is adapted to interact by its pointed tip with the valve seat 21 and by the radially projecting portion of the base of the tip 23 with the inner face of the cylinder 14. The opposite end of the stem 22 is received in the sleeve 19 for axial repiprocation within this sleeve 19 and for interaction with the closed end of the sleeve 19 under the action of a resilient element in the form of a compression spring 24 restrained between an abutment 25 of the stem 22 and the adjacent outer face of the hollow cylinder 14. The sleeve 19 has its closed end fixedly attached to the output element 26 of the actuating mechanism 27 of the gas flow governor 3.

The check valve 4 has a housing made of two parts 28 and 29 with a diaphragm 30 interposed between these two parts 28, 29, having a valve seat 31 built into its central part. Underlying the valve seat 31 is a valve member 32 mounted for reciprocation along guides 33.

The valve 4 is adapted to close when no gas is supplied via the gas supply line.

The liquid (water) flow meter 9 comprises a restriction member in the form of an annular diaphragm 34 built into the water supply line 6 and a differential pressure gauge 35 associated with a differential-transformer transducer 36.

The device 10 for measuring concentration of chlorine in water includes a transducer 37 connected to a direct-current amplifier 38.

The apparatus for automatically metering chlorine into water further includes a control system 39 including a converter 40 having its output connected to the input of a distributing unit 41, the latter having its output connected via a twin two-way selector switch 42 either to the input 43 of an analog multiplier unit 44 (with the switch 42 set to "I") or to the input 45 of a logical unit 46 (with the switch 42 set to "II"). The output of the multiplier unit 44 is connected via the selector switch 42 to another input 47 of the logical unit 46 (when the switch 42 is set to "I"). With the selector switch 42 set to "II", the input 47 of the logical unit 46 is disconnected from the output of the multiplier unit 44 and connected to the output of a master control 48 of the chlorine-to-water flow ratio.

The control system 39 further includes a converter 49, a distributing unit 50 having its input connected to the output of the converter 49, and a gas flow registering unit 51 connected to the output 52 of the distributing unit 50. Connected to another output 53 of the distributing unit 50 is an indicator 54 of the gas flow rate, mounted adjacent to the gas flow governor 3, and still another output 55 of the distributing unit 50 is connected to the input 56 of the logical unit 46. The latter has its output connected to the input of a regulating unit 57 whose output is the output of the control system 39, connected to an electric motor 58 of the actuating mechanism 27 of the gas flow governor 3.

The control system 39 further includes a unit 59 for dynamic conversion, fed through its inputs with signals coming from the device 10 measuring the concentration of chlorine in water and from a master control 60 of concentration of chlorine in water, the output of the dynamic conversion unit 59 being connected to the input 61 of the analog multiplier unit 44. A water flow registering unit 62 is connected to the output of the distributing unit 41. The inputs of the control system 39 are the input of the converter 40 connected to the output of the water flow meter 9 and the input of the converter 49 connected to the output of the gas flow meter 2, i.e. to the output of a differential-transformer transducer 63. The herein disclosed automatic metering apparatus further incorporates an indicator 64 of the position of the movable member (the stem 22) of the needle valve.

The conversion units or converters 40 and 49 are of an identical design, each comprising a demodulator 65 and a corrector 66 connected through a summer 67 to a direct-current amplifier 68, and a ferroresonance voltage regulator 69. The ferroresonance voltage regulator 69 of the convertor 40 is connected to the differential-transformer transducer 36, while the ferrorresonance voltage regulator 69 of the converter 49 is connected to the differential-transformer transducer 63.

The distributing units 41 and 50 are likewise of an identical design, each comprising two diodes 70 connected in series, and a resistor 71 being connected to the anode of one of the two diodes 70.

The regulating unit 57 includes a series connection of a modulator 72, an alternating-current amplifier 73, a demodulator 74 and a magnetic amplifier 75 whose output is the output of the unit 57, connected via a feedback unit 76 and a summer 77 to the input of the modulator 72. The other input of the summer 77 is the input of the unit 57.

The dynamic conversion unit 59 includes a series connection of a comparison unit 78, an analog-to-frequency converter 79, a variable frequency divider 80, a reversible (up-down) binary counter 81, an integrating storage 82 and a frequency-to-analog converter 83. The control input of the variable frequency divider 80 is connected to a master control 84 for setting the required division ratio in the divider 80. One input of the comparison unit 78 is connected to the output of the master control 60 of concentration of chlorine in water, and its other input is connected to the device 10 measuring the concentration of chlorine in water supply.

The indicators 54 and 64 may be in the form of either milliammeters or millivoltmeters, and the registration units 51 and 62 may be either electronic oscilloscopes or electronic potentiometers.

The logical unit 46 includes a division circuit and a comparison circuit. The inputs of the division circuit are the inputs 45 and 56 of the unit 46, and its output is connected to one of the inputs of the comparison circuit.

The apparatus for automatically metering chlorine into water, embodying the present invention, operates as follows.

Chlorine in gaseous form is fed through the open control valve 8 to the filter 7 to be purified from mechanical impurities. The pressure of gaseous chlorine is maintained at a predetermined permanent value by the gas pressure regulator 1, and the input of gaseous chlorine is measured with the aid of the differential-transformer transducer 63 associated with the gas flow meter 2. Gaseous chlorine further flows through the gas flow governor 3 and enters via the open check valve 4 the ejector 5 to be mixed with water supplied under pressure in the direction of arrow C, to advance in a gas/liquid mixture into the main stream of chlorinated water in the supply line 6, flowing in the direction of arrow B. If no water is supplied under pressure in the direction of arrow C into the ejector 5, the pressure within the chamber 11 equals the atmospheric value, the diaphragm 12 is urged by the spring 15 against the cover 16, the cylinder 14 is in its leftmost (in the drawing) position, its respective inner face engaging the base of the tip 23, urging the latter into the closed position of the needle valve. Thus, with no suction in the gas supply line in its part between the ejector 5 and chamber 11, the needle valve in the chamber 11 is closed, and no gas is supplied to the ejector 5 even when the control valve 8 is open.

When water is supplied under pressure in the direction of arrow C into the ejector 5, suction is created in the gas supply line, the diaphragm 12 moves the cylinder 14 to the right, and the action of the spring 24 also moves the stem 22 to the right, forming a gap between the seat 21 of the needle valve and the pointed tip 23. The needle valve is open, and gaseous chlorine is supplied to the ejector 5.

The actual position of the stem 22 (defining the position of its pointed tip 23 relative to the seat 21 of the needle valve, i.e. the degree of opening of the needle valve) is now governed by the position of the output element 26 of the actuating mechanism 27 of the gas flow governor 3, the sleeve 19 serving to transmit the effort of the actuating element 26 to the stem 22. The action of the spring 24 received between the abutment 25 and the end of the hollow cylinder 14 establishes rigid connection between the stem 22 and the sleeve 14 unless the diaphragm 12 fixed to the hollow cylinder 14 acts upon the stem 22.

Gaseous chlorine flowing through the gas flow governor 3 enters the hollow cylinder 14 through the open needle valve and flows via the slots 18 into the chamber 11, to leave the latter via the outlet of the gas flow governor 3 toward the valve member 32 of the check valve 4.

When suction is created in the part 28 of the housing of the check valve 4, it produces an effort overcoming the resilience of the diaphragm 30, so that the pressure differential across the inlet and outlet of the check valve 4 lifts off the seat 31 of the valve, releasing the valve member 32 which rises along the guides 33 under the action of the gas pressure, opening a flow path for gaseous chlorine through the part 29 of the housing of the valve 4. As the pressure differential across the inlet and output drops, the resilience of the diaphragm 30 drives down the valve seat 31, the latter interacting with the valve member 32 to check eventual advance of water from the ejector 5 toward the gas flow governor 3.

The input of gaseous chlorine flowing through the gas flow meter 2 is measured with the aid of the differential-transformer transducer 63 and converter 49 sending its signal through the signal-distributing unit 50 into the logical unit 46, flow indicator 54 and registering unit 51.

The water flow is measured with the aid of the restriction diaphragm 34 and differential pressure gauge 35, the signal obtained being sent by the differential-transformer transducer 36 to the converter 40, to be routed to the distributing unit 41 and then to the water flow registering unit 62, and through the selector switch 42 either to the input 43 of the analog multiplier unit 44 or to the input 45 of the logical unit 46.

The apparatus embodying the invention is operable either in a mode of regulating a predetermined ratio of the flows of water and gaseous chlorine, or else in a mode of maintaining a predetermined concentration of chlorine in water.

When the apparatus is operated in the flow ratio maintaining mode, the value of the ratio being preset with the flow ratio master control 48, the selector switch is set to "II". In this mode, a signal proportional to the actual flow ratio sent by the output of the division circuit of the unit 46 is compared with the signal representing the flow ratio preset with the master control 48, and an error signal, if detected, is fed to the regulating unit 57.

The output signal formed at the output of the regulating unit 57 is sent to the electric motor 58 of the actuating mechanism 27 of the gas flow governor until the preset ratio of the water gaseous chlorine flows is restored.

When the herein described atuomatic metering apparatus is operated in the mode of maintaining a preset concentration of gaseous chlorine in water, the two-way selector switch 42 is set to "I".

The required concentraitn of chlorine in water is preset with the master control 60 feeding its output signal representing the preset concentration to the comparison unit 78 which is also fed with a signal from the device 10, representing actual concentration of chlorine in water.

The two signals are compared in the comparison unit 78, and when the actual concentration value differs from the preset one, a signal is sent from the output of the analog-to-frequency converter 79 to the variable frequency divider 80 whose division ratio is preset with the master control 84. The variable frequency divider 80 sends its output signal to the up-down binary counter 81 operating either in addition ("UP") or subtraction ("DOWN") depending on the signal of the output signal of the comparison unit 78. The output signal of the up-down binary counter 81 is fed to the input of the integrating storage 82 whose output is connected to the input of the frequency-to-analog (D-A) converter 83. The dynamic conversion unit 59 forms at its output a signal for correction of the chlorine to water flow ratio as a function of the required concentration of chlorine in water. The output signal of the unit 59 is fed to the input 61 of the analog multiplier unit 44 whose input 43 is fed with a signal proportional to the water flow rate from the output of the distributing unit 41. The output signal of the unit 44 is fed to the input 47 of the logical unit 46, to be compared with a signal fed to the input 56 of the same unit 46, porportional to the gaseous chlorine flow rate. In response to the signal coming from the output of the logical unit 46 through the regulating unit 57, the actuating mechanism 27 of the gas flow governor 3 moves the stem 22 of the needle valve until the input of gaseous chlorine satisfies the concentration value of chlorine in water preset with the master control 60.

The conversion unit 40 operates as follows.

Alternating-current voltage coming from the differential-transformer transducer 36 is converted by the demodulator 65 into d.c. voltage and summed up with the voltage of the corrector 66. The summer 67 has its output signal amplified by the d.c. amplifier 68 forming at its output a d.c. signal proportional to the input of water, fed to the distributing unit 41. The primary winding of the differential-transformer transducer 36 is supplied with power from the ferroresonance voltage regulator 69 built into the converter 40.

INDUSTRIAL APPLICABILITY

This apparatus can be used in chemical industry to introduce, for example, ammonia or sulfate gas into liquids when purifying drain water, particularly at water treatment plants when chlorine is metered into water.

I claim:

1. An apparatus for automatically metering gas into liquid, comprising successively arranged in a gas supply line, a gas pressure regulator (1), a gas flow meter (2), a gas flow governor (3), a vacuum check valve (4), and an ejector (5) connected to a supply line (6) of the liquid being gasified, a liquid flow meter (9) installed in the supply line (6) of the liquid, and a control system (39) having respective inputs connected to outputs of the gas and liquid flow meters (2,9) and its output connected to an actuating device (27) of the gas flow governor (3), charactertized in that the gas flow governor (3) and vacuum check valve are integrated into a single unit comprising a sealed chamber (11) having its two opposite walls formed by two substantially parallel diaphragms (12,13), a hollow cylinder (14) accommodated between the two diaphragms (12,13) and having its one end fixedly attached to one diaphragm (12) for axially reciprocating therewith and having a central opening (17) made through the other end thereof, a sleeve (19) having one end closed and mounted coaxially with the cylinder (14) in the center of the other diaphragm (13) and fixedly attached by the closed end thereof to an output element (26) of the actuator (27) of the gas flow governor (3), a needle valve having its seat (21) accomodated inside the hollow cylinder (14) coaxially therewith and mounted in the side wall of a closed-end pipe (20) communicating with the internal space of the gas flow meter (2) and extending through a slot (18) in the side wall of the cylinder (14), a valve member of said needle valve being in the form of a stem (22) with a pointed tip (23) provided on its one end, extending axially with the cylinder (14), the end of the stem (22) with the tip (23) being introduced through the central opening (17) into the internal space of the cylinder (14) so that the pointed tip thereof interacts with the seat (21), while the base of the tip (23) interacts with the internal surface of the butt end of the hollow cylinder (14), the other end of the stem (22) being mounted in the sleeve (19) for reciprocation therein and interaction with the closed end of the sleeve (19) under the bias of a resilient member.

* * * * *